O. LARSON.
PNEUMATIC TIRE SHOE.
APPLICATION FILED JUNE 12, 1919.
1,355,609.
Patented Oct. 12, 1920.
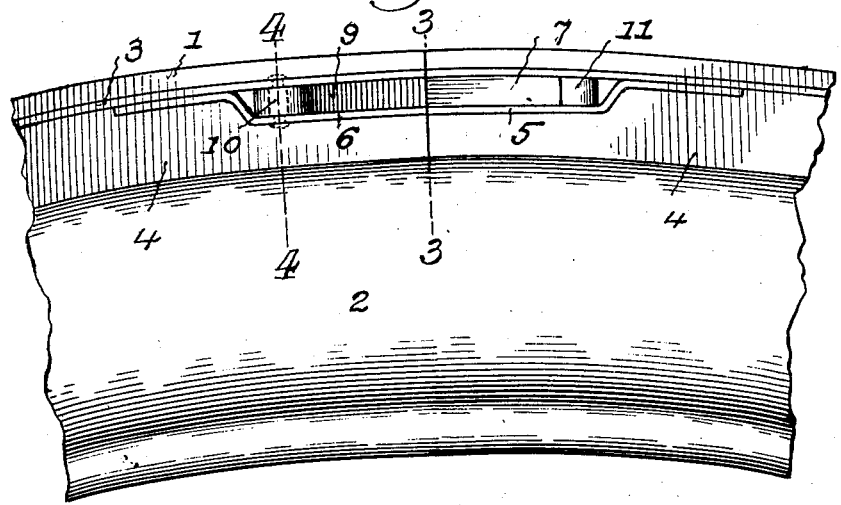
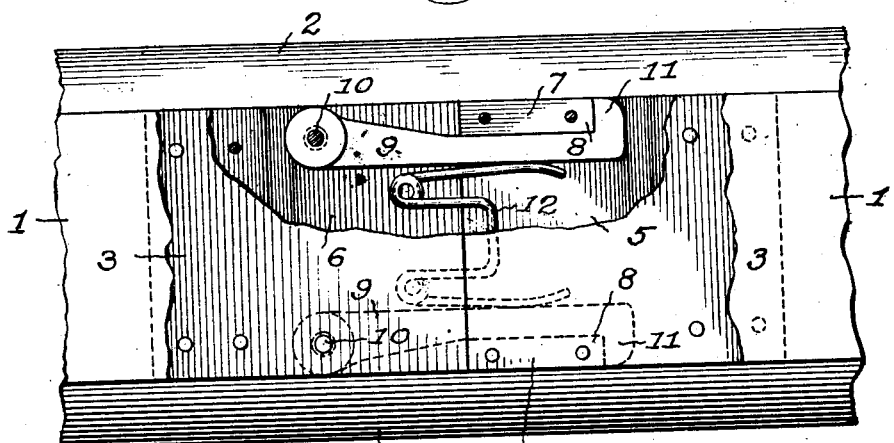
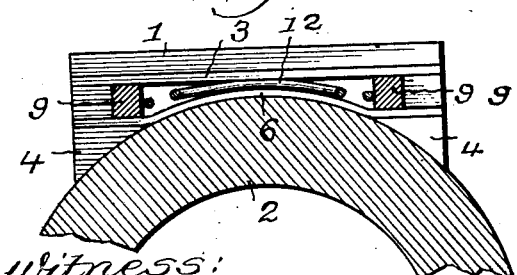
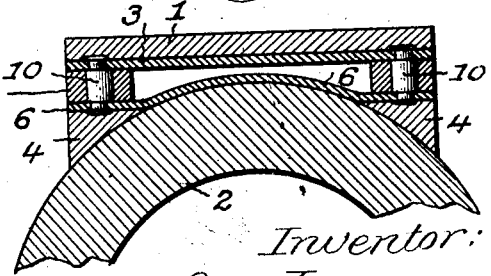
Witness:
John Enders
Inventor:
Otto Larson,
by Robert Burns
Atty.

UNITED STATES PATENT OFFICE.

OTTO LARSON, OF CHICAGO, ILLINOIS.

PNEUMATIC-TIRE SHOE.

1,355,609.  Specification of Letters Patent.  Patented Oct. 12, 1920.

Application filed June 12, 1919. Serial No. 303,668.

*To all whom it may concern:*

Be it known that I, OTTO LARSON, a citizen of the United States of America, and a resident of Chicago, in the county of Cook, State of Illinois, have invented certain new and useful Improvements in Pneumatic-Tire Shoes, of which the following is a specification.

This invention relates to that type of protecting shoes for pneumatic tires having a transversely divided annular form, with the joining ends secured together by a detachable fastening, and the shoe structure being held in place by the inflation of the tire after the shoe has been applied. And the present improvement has for its object:

To provide a simple and substantial structural formation and association of parts in a transversely divided protecting shoe for pneumatic tires, in which the abutting ends of the shoe are connected together in a strong and substantial manner by circumferentially or longitudinally arranged dual latching means located at the inside of the shoe and at the respective sides of the shoe, so that with the shoe in place no solid spots are formed around the crown of the pneumatic tire to interfere with the proper running of the same in actual use, all as will hereinafter more fully appear.

In the accompanying drawing:—

Figure 1, is a fragmentary side elevation illustrating the general arrangement of parts in the present improvement.

Fig. 2, is a detail plan view of the same, with parts of the shoe removed and in section to illustrate the structure of the dual latching means.

Figs. 3 and 4 are transverse sections on lines 3.—3. and 4.—4. respectively of Fig. 1.

Like reference numerals indicate like parts in the several views.

Referring to the drawing, 1 designates the annular tread member of the shoe, transversely divided and formed of leather or like pliable wear resisting material, with a width somewhat less than the width of the pneumatic tire casing 2 with which it is associated.

3 designates a companion flat band of metal or like puncture resisting material arranged at the inside of tread member 1 aforesaid and having a width equal to that of said tread member 1, and transversely divided in like manner at a common point.

4 designates a pair of counterpart annular filler or bearing rings, of a triangular form in cross section and located at the inside of the band 3 and at the respective sides of the same as shown.

The tread member 1, band 3 and filler rings 4, are secured together in a substantial manner by rivets or other usual connecting means, as usual in the present type of protecting shoes. And in the present improvement the respective ends of the annular transversely divided band 3 are provided with strap members 5 and 6 transversely arched so as to conform to the curving surface of the tire and riveted or otherwise secured to the band 3, with the portions next adjacent to the slit or circumferential opening of the shoe, deflected inwardly from the tread surface thereof, to provide in connection with the end portions of the band 3 side receiving recesses or pockets for the reception and attachment of the latch members now to be described.

7 designates latch blocks circumferentially arranged and fixedly attached in one pair of the aforesaid side recesses or pockets, by rivets or like means, and having their inner and remote corners formed as latch shoulders 8, as shown.

9 designates latch bars arranged circumferentially or longitudinally in the other pair of the aforesaid side recesses or pockets, and pivoted at one end in said recesses or pockets by shouldered radial pivot pins 10. At their free ends said longitudinal latch bars are formed with hooks or jaws 11 for latching engagement with the latch shoulders 8 of the latch blocks 7 aforesaid.

12 designates a W-shaped spring member arranged intermediate of the longitudinal latch bars 9 and adapted to yieldingly force the same outward into engagement with the latch blocks 7.

With the present construction the dual latching means are located wholly at the respective sides of the shoe, a distance removed from the center or crown of the pneumatic tire casing 2 when in place, and as so arranged avoids objectionable hard spots at the center of shoe and over such center or crown of the pneumatic tire casing 2.

Having thus fully described my said invention what I claim as new and desire to secure by Letters Patent, is:—

A protecting shoe for tires comprising an outer annular tread member transversely divided, an inner annular band of puncture resisting material transversely divided on the same line as the tread member, a pair of counter-part annular filler rings adapted to fit between the tire and the annular band, and transversely divided on the same line as the tread member and band, means securing the tread member, band and filler rings together, circumferentially arranged strap members deflected inwardly and transversely arched so as to conform to the curved surface of the tire, providing side pockets, and secured to the band and a pair of circumferentially arranged fastening means located wholly within the side pockets for securing the divided parts of the protecting shoe together leaving the middle portion of the protecting shoe free of the fastening means.

Signed at Chicago, Illinois, this 10th day of June, 1919.

OTTO LARSON.